April 21, 1953        R. T. CORNELIUS        2,635,630
VALVE AND PRESSURE GAUGE
Filed Oct. 13, 1947
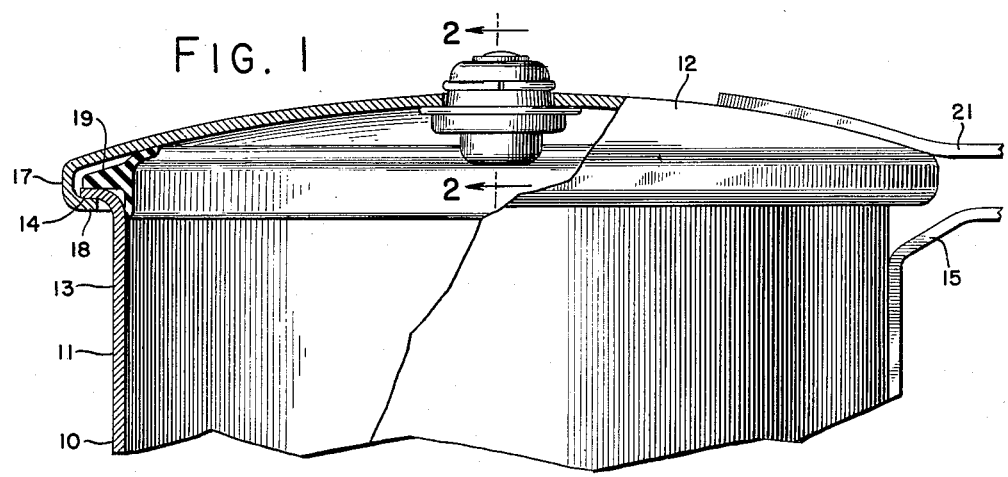
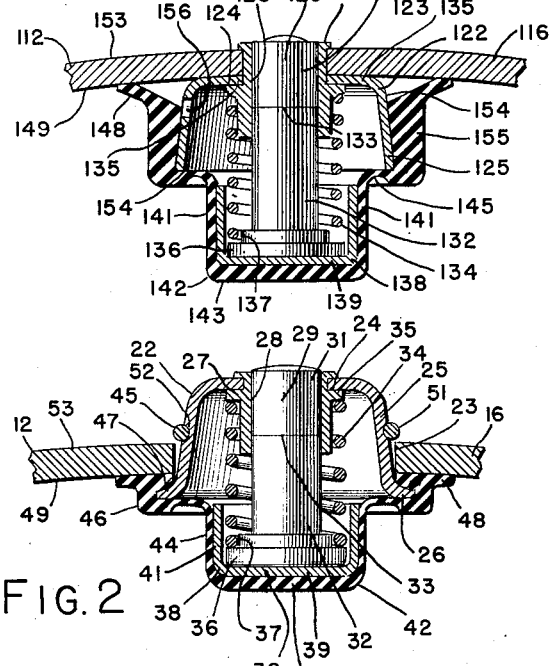
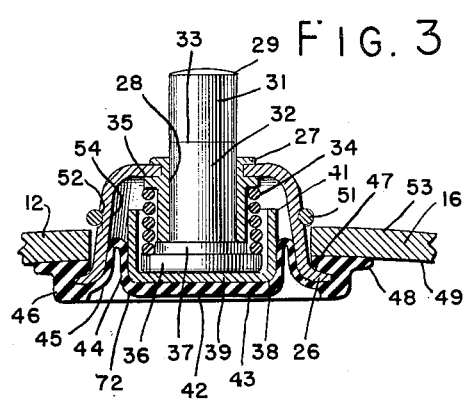
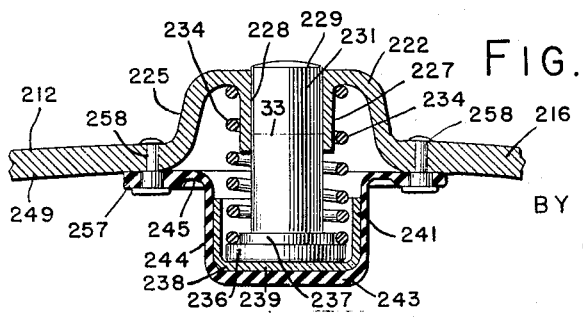
INVENTOR
RICHARD T. CORNELIUS
BY Caswell & Lagaard
ATTORNEYS Patented Apr. 21, 1953

2,635,630

UNITED STATES PATENT OFFICE 2,635,630

VALVE AND PRESSURE GAUGE

Richard T. Cornelius, Minneapolis, Minn.

Application October 13, 1947, Serial No. 779,598

9 Claims. (Cl. 137—525)

My invention relates to pressure gauges and particularly to a pressure gauge for use with pressure cookers.

An object of the invention resides in providing a gauge which will accurately indicate when the pressure in the cooker exceeds the desired pressure.

Another object of the invention resides in providing a gauge which can be easily understood and read.

A still further object of the invention resides in providing a gauge which will be sanitary in use and which may be readily taken apart for cleaning and repair.

An object of the invention resides in providing a pressure gauge by means of which a vacuum in the container with which the gauge is used, can be relieved.

Another object of the invention resides in providing a gauge having a housing with a plunger slidable therein and a flexible sack enveloping the plunger and having a cylindrical wall adapted to enter into the housing as the pressure in the container increases.

A feature of the invention resides in constructing said sack so that the cylindrical wall thereof doubles back upon itself and follows along the inner surface of the housing as the pressure increases.

A feature of the invention resides in constructing the sack with a lip adapted to be brought into engagement with the inner surface of the container upon the existence of pressure within the container, said lip being adapted to become disengaged therefrom upon the creation of a vacuum within the container.

Another object of the invention resides in providing a housing having a guide in which the plunger is slidable and in causing the said plunger to normally project outwardly beyond the housing and said sack to be normally exposed to permit of readily cleaning the same.

Other objects of the invention reside in the novel combination and arrangement of parts and in the details of construction hereinafter illustrated and/or described.

In the drawings:

Fig. 1 is an elevational view of a portion of a pressure cooker with part of the same in sections and illustrating an embodiment of my invention applied thereto.

Fig. 2 is an elevational sectional view taken on line 2—2 of Fig. 1 and drawn to an enlarged scale.

Fig. 3 is a view similar to Fig. 2 showing the parts arranged with the container under pressure greater than normal operating pressure.

Fig. 4 is a view similar to Fig. 2 of a modification of the invention.

Fig. 5 is a view similar to Fig. 2 of still another form of the invention.

For the purpose of illustrating my invention, I have shown in Fig. 1, a portion of a pressure cooker 10 having a container 11 open at the top and adapted to be closed by means of a closure 12. The container 11 has a cylindrical wall 13 formed with spaced lugs 14 extending outwardly therefrom. A handle 15 is attached to the wall 13 and extends outwardly therefrom. The closure 12 has a dome shaped wall 16 which terminates in a depending flange 17 encircling the lugs 14. This flange has inwardly turned lugs 18 which cooperate with the lugs 14 to lock the closure in position upon rotation of the same. A gasket 19 lies between the wall 13 of the container 11 and the wall 16 of the closure 12 and forms a seal therebetween. Closure 12 is provided with a handle 21 which is adapted to be brought into register with the handle 15 when the closure is in closing position.

The invention proper is shown in detail in Figs. 2 and 3 and comprises a housing 22 which is received within an opening 23 in the wall 16 of closure 12. This housing has an end 24 and a skirt 25 depending therefrom and is constructed somewhat frustoconical in form. The said skirt terminates at its inner end in a flange 26 turned outwardly from the skirt 25. The end 24 of the housing 22 has mounted in it a bushing 27 which is formed with a bore 28 and which serves as a guide for a plunger 29. The plunger 29 is preferably constructed of plastic material and the upper portion 31 is made of black material while the lower portion 32 is made of red material. The juncture of the two portions is indicated at 33. Encircling the bushing 27 and the plunger 29 is a compression coil spring 34 which is seated at one end against a flange 35 formed on the bushing 27 and at its other end against a flange 36 formed on the plunger 29. This flange has a shoulder 37 which holds the spring centered relative to the said plunger.

Mounted upon the inner end of the plunger 29 is a cup shaped head 38 having an end portion 39 and a skirt 41 extending outwardly therefrom and in the opposite direction of the skirt 25. The skirt 41 is of considerably less diameter than the skirt 25 and becomes spaced therefrom when the parts are moved to the position shown in Fig. 3. Applied to the outer surface of the head 38 is a flexible sack 42. This sack consists of an end 43 and a tubular portion 44 extending outwardly therefrom. Said tubular portion has extending radially therefrom a radial portion 45 which terminates in a ring 46 of heavier material than the portions 44 and 45. The said ring has an annular groove 47 in the same which receives the flange 26 of housing 22 and holds the sack 42 attached to said housing. At the outer extremity of the ring 46 is a lip 48 which when pressure is applied to the interior of the container 11 engages the inner surface 49 of the wall 16 of closure 12 to form a seal with said closure. The housing 22 is held in position within the opening 23 by means of the flange 26 and also by means of a split ring 51, which is received in a groove 52 in the skirt 25 of housing 22. This ring lies slightly above the upper surface 53 of the wall 16 and permits the housing 22 to move inwardly into the container 11 a small amount when the pressure in the said container is reduced below normal, thus causing the lip 48 to recede from the surface 49 and to relieve the vacuum within the container.

The operation of the invention is as follows: When there is no steam in the pressure cooker ring 51 rests on the wall 16 of closure 22 and supports the housing 22 and attached parts from the closure 12. In such position the opening 23 is practically closed. The escape of steam through said opening is hence not great enough to prevent the pressure from building up in the cooker. The velocity of the escaping steam is in a direction tending to move the sack 42 and housing 22 upwardly and when sufficient steam has been generated in the cooker the parts are moved upwardly and assume the position shown in Fig. 2. Thus further escape of steam is prevented. The spring 34 is so designed that when the plunger 29 has been moved toward its position shown in Fig. 3 and the line 33 just becomes visible that the pressure cooker is operating at the desired pressure. Any pressure in excess of this causes the red portion 32 to show and to warn the user of the excess pressure. As the plunger 29 moves inwardly the tubular portion 44 of the sack 38 doubles back upon itself and follows along the inner surface 54 of the skirt 25 of housing 22. As the pressure increases the bight between the folded parts of the portion 44 becomes sharper and sharper to resist the added pressure. This is procured by constructing the skirt 25 of the housing 22 slightly frusto-conical in form. When the pressure in the cooker is to be reduced the cooker is usually placed under a faucet and cold water flowed over the same. This condenses the steam in the cooker and usually brings the pressure in the cooker below atmospheric. In such case the external pressure holds the closure so tightly closed that it is only with difficulty that the handles 15 and 21 may be rotated and the closure removed. With the instant invention, the pressure on the housing 22 forces the same inwardly and permits the air to escape through the opening 23 and into the interior of the pressure cooker past the lip 48.

In Fig. 4, I have shown a modification of the invention in which the housing is disposed substantially entirely within the interior of the pressure cooker. Due to the similarity of construction of the two forms of the invention the description of the corresponding parts will not be repeated and the same reference numerals preceded by the digit 1 will be used to designate corresponding parts. In this form of the invention the end 135 of the housing 122 is disposed upon the interior of the pressure cooker and the bushing 127 caused to extend jointly through the end 125 of said housing and the wall 16, thereby attaching the housing to the closure. In this case the sack 142 is provided with a ring 155 which fits upon the outer surface 154 of the skirt 125 of the housing 122. The flange 26 formed on the housing 22 of the other form of the invention is with this form of the invention dispensed with and the sack 142 retained upon the housing 122 by means of the taper afforded through the shape of the skirt 125. When the parts are in normal position the lip 148 engages the inner surface 149 of the closure 116. To permit relieving of the pressure in the interior of the pressure cooker a vent 156 is provided in the skirt 125 of the housing 22. This vent communicates with the space between the ring 155 and the surface 149 and permits air to follow along the bore 128 of the bushing 127 and through said vent and into the interior of the pressure cooker.

In Fig. 5 I have shown still another form of the invention. In this form of the invention parts corresponding to those illustrated in Figs. 2 and 3 will be referred to by the same reference numerals and preceded by the digit 2 and the description of such parts will not be repeated. In the form of the invention shown in Fig. 5 the housing 222 and the bushing 227 are made integral with the wall 16 of closure 12. The sack 239 is in this form of the invention constructed without the ring 46, the radial portion 245 extending outwardly beyond the wall 225 of housing 222 and being increased in thickness at such portion as designated at 257. A number of rivets 258 spaced circumferentially about the portion 257 extends through said portion and is riveted to the wall 216 of the closure 212. This device functions in the same manner as that disclosed in Figs. 2 and 3 except that the air flowing through the bore 228 forces the portion 257 of sack 238 between rivets 258 away from the wall 216 and escapes into the interior of the pressure cooker. When the pressure reverses the portion 257 is urged by pressure against the surface 249 of wall 216 and a fluid tight joint is procured.

The advantages of the invention are manifest. The device is extremely simple in construction and with one form of the invention can be applied to the pressure cooker easily and quickly. The flexible sack being disposed entirely upon the interior of the pressure cooker may be readily cleaned and washed without causing the lodging of food and other undesirable matter in the interior of the gauge or within crevices formed within the sack. The entire gauge may be easily removed from the cooker by spreading apart the split ring 51 and drawing the gauge through the opening 23 and into the interior of the closure 12. After removal the sack 38 may be disengaged from the flange 26 whereupon all of the parts of the gauge are available for inspection, cleaning and replacement when the occasion requires. The gauge is simple in operation and quickly and effectively indicates when the pressure within the pressure cooker exceeds that for which the pressure cooker is set. The gauge is easy to understand and read.

Changes in the specific form of my invention, as herein described, may be made within the scope of what is claimed without departing from the spirit of my invention.

Having described my invention, what I claim as new and desire to protect by Letters Patent is:

1. In combination with the wall of a container having an opening therein, a housing disposed at said opening and extending outwardly from said wall, a guide in said housing, a plunger slidable in said guide and projecting inwardly of said wall, a spring acting between said housing and plunger and urging the same inwardly, a flexible sack enveloping said plunger, a lip on said sack engageable with the inner surface of said wall to effect a seal therebetween, said plunger upon increase in pressure in the container moving outwardly and said sack following said plunger and moving along the inner surface of the housing, said lip upon reduction in pressure below atmospheric pressure moving away from the inner surface of said wall to relieve the vacuum in said container and means for yieldingly holding said lip in a position to be engaged by said wall.

2. In combination with a wall of a container having an opening therein, a cup shaped housing received within said opening and projecting outwardly therefrom, a stop on said housing for limiting inward movement thereof, a guide in said housing, a plunger slidable in said guide and projecting inwardly of said housing, a spring acting between said housing and plunger and urging the same inwardly, a flexible sack enveloping said plunger a lip on said sack engageable with said container, a flange on the inner end of said housing and engaging said sack at said lip, said flange being of greater diameter than the opening in said wall, said flange yieldably holding said lip in a position to be engaged by said wall.

3. In combination with a wall of a container having an opening therein, a cup shaped housing received within said opening and projecting outwardly therefrom, a groove in said housing exteriorly of the outer surface of said wall, a split ring received in said groove and engageable in said wall to restrain inward movement of said housing, a flange at the inner end of said housing end of a diameter greater than the diameter of said opening, a guide in said housing, a plunger slidable in said guide and projecting inwardly of said housing, a spring acting between said housing and plunger and urging the same inwardly, a flexible sack enveloping said plunger, an annular ring on said sack, said ring having a groove therein for the reception of said flange, a lip on said ring engageable with the inner surface of said wall to effect a seal therebetween, said lip upon pressure being applied within the container seating against said wall and upon a vacuum being formed in said container receding from said wall to the extent limited by said split ring.

4. In combination with a wall of a container, a cup shaped housing carried by said wall and having a skirt extending toward the interior of the container, said housing having an opening therein forming a guide, a plunger slidable in said guide and projecting inwardly of said skirt, a spring acting between said housing and plunger and urging said plunger inwardly, a cup shaped head on the inner end of said plunger and having a skirt spaced from the skirt of said housing to form an annular space therebetween when the plunger moves outwardly, a flexible sack enveloping said plunger and having a sleeve-like portion fitting about the skirt of said head and extending across the skirt of said housing, and an annular lip on said sack engageable with said wall of the container intermediate the outer end of said housing and the inner end of said head of the plunger when the plunger is in its innermost position, said sleeve-like portion upon pressure being produced within the container urging plunger outwardly and forming in said sack a fold adapted to extend into said annular space and to follow along said space in an outward direction as the plunger moves outwardly.

5. In combination with a wall of a container, a cup shaped housing carried by said wall and having a skirt extending toward the interior of the container, said housing having an opening therein forming a guide, a plunger slidable in said guide and projecting inwardly of said skirt, a spring acting between said housing and plunger and urging the plunger inwardly, a cup shaped head on the inner end of said plunger and having a skirt spaced from the skirt of said housing, one of said skirts being tapered to form an annular space between said skirts of lessening cross sectional area outwardly from said wall, a flexible sack enveloping said plunger and having a sleeve-like portion fitting about the skirt of said head and extending across the skirt of said housing, and an annular lip on said sack engageable with said wall of the container intermediate the outer end of said housing and the inner end of said head of the plunger when the plunger is in its innermost position, said sleeve-like portion upon pressure being produced within the container urging said plunger outwardly and forming in said sack a fold adapted to extend into said annular space and to follow along said space in an outward direction as the plunger moves outwardly, said fold being progressively collapsed to increase its resistance to pressure as the fold travels along said space due to increase in pressure in the container.

6. In combination with the wall of a container having an opening therein, a housing disposed at said opening, a guide in said housing, a plunger slidable in said guide and projecting inwardly beyond said housing, a spring acting between said housing and plunger and urging the plunger inwardly, a flange extending radially outwardly from the inner end of said housing, a flexible sack enveloping said plunger, said sack having a groove near its open end for the reception of said flange and being adapted to be stretched to receive said flange and thereby holding the sack attached to the housing and a lip on said sack at the locality of said groove for engagement with said wall of the container.

7. In combination with a wall of a container, a cup shaped housing carried by said wall and having an inner elongated surface of revolution open at its inner end, means in said housing forming a guide coaxially disposed with reference to said surface, a plunger slidable in said guide and into the interior of the container and below said surface, a spring acting between said housing and plunger and urging the plunger inwardly, said plunger forming with said surface of the housing an annular space, a flexible sack disposed normally wholly within the container and extending across the open end of the denoted surface of said housing, said sack having a lip engaging the inner surface of said wall, a sleeve like portion on said sack normally extending inwardly of said surface of the housing and receiving said plunger, said sleeve like portion upon pressure being produced within the container urging said plunger outwardly and forming in said sack a fold adapted to extend into said annular space and to follow along the inner surface of the housing as the plunger moves outwardly.

8. In combination with a wall of a container having an opening therein, a cup shaped housing carried by said wall and disposed at said opening, said housing having a skirt extending inwardly into the container, the lower end of said skirt flaring outwardly, a guide in said housing, a plunger slidable along said guide, resilient means acting between said housing and plunger and urging said plunger inwardly into the container, a flexible sack eveloping said plunger, a ring on said sack at the outermost portion thereof, said ring having a recess therein for the reception of the flared portion of said skirt, said ring being formed with a lip engaging the inner surface of said wall, said ring being adapted to be stretched to allow application to or removal of the sack from said flared portion of the skirt, said flared portion holding the lip in engagement with said wall.

9. In combination with a wall of a container having an opening therein, a cup shaped housing received within said opening and projecting outwardly therefrom, a guide in said housing, a plunger slidable in said guide and projecting inwardly of said housing and into the container, a spring acting between said housing and plunger and urging the plunger inwardly, a flexible sack enveloping said plunger and mounted on said housing, a lip on said sack engageable with the inner surface of said wall to effect a seal therebetween, said sack upon increase in pressure within the container following along the inner surface of said housing, said housing being movable into said container to accommodate disengagement of said lip from said wall.

RICHARD T. CORNELIUS.

References Cited in the file of this patent
UNITED STATES PATENTS

| Number | Name | Date |
| --- | --- | --- |
| 1,226,870 | Duryea | May 22, 1917 |
| 1,806,372 | Stille | May 19, 1931 |
| 2,068,481 | Brown | Jan. 19, 1937 |
| 2,225,674 | West | Dec. 24, 1940 |
| 2,225,675 | West | Dec. 24, 1940 |
| 2,254,557 | Wittenberg | Sept. 2, 1941 |
| 2,297,378 | Wittenberg | Sept. 29, 1942 |
| 2,429,149 | Wittenberg | Oct. 14, 1947 |